Aug. 20, 1940.          L. B. SPIRES                2,212,081
                      TRAILER HITCH
                Filed Jan. 27, 1939          3 Sheets-Sheet 1
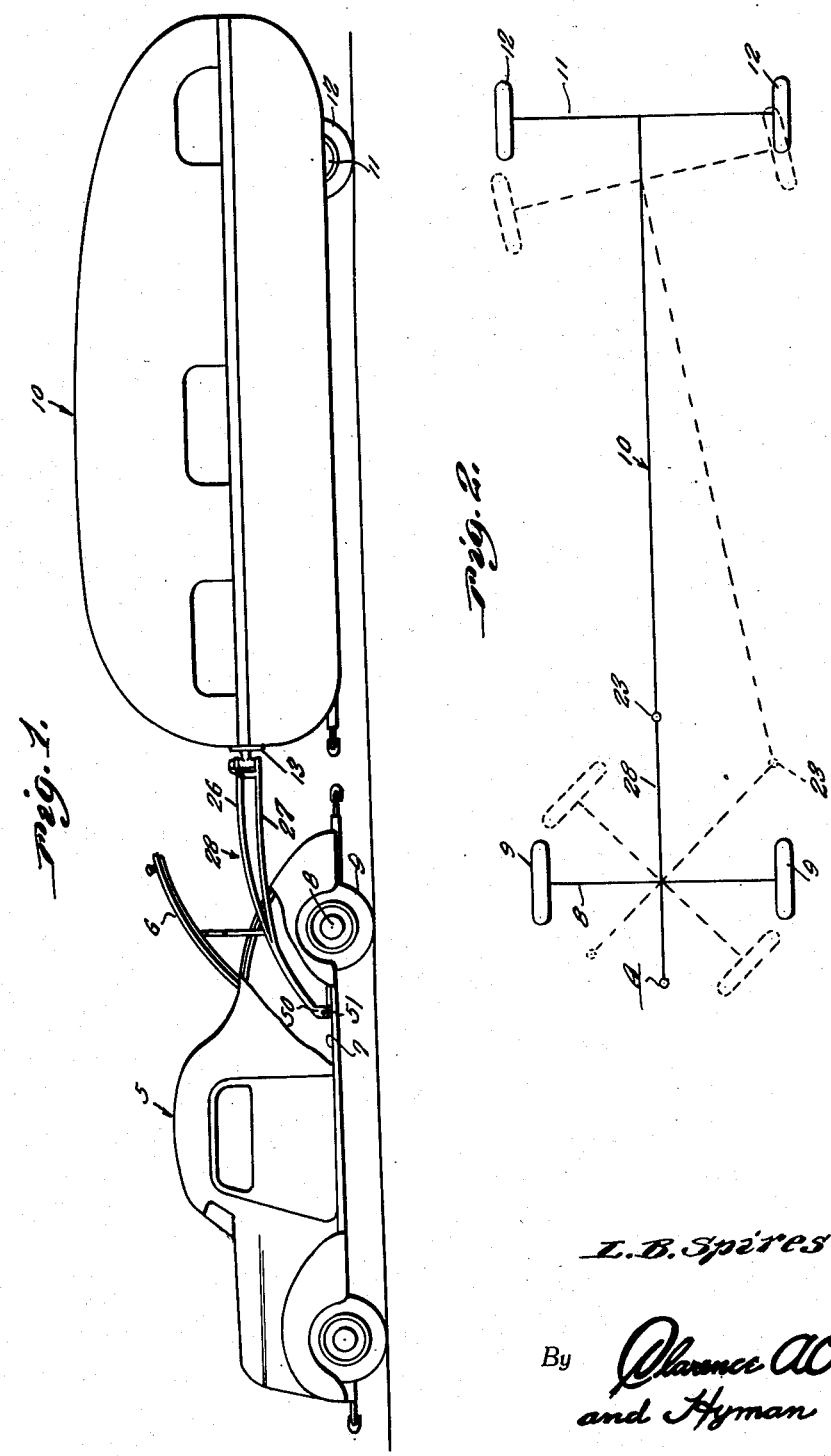
Inventor
L. B. Spires
By Clarence A. O'Brien
and Hyman Berman
Attorneys Aug. 20, 1940.  L. B. SPIRES  2,212,081
TRAILER HITCH
Filed Jan. 27, 1939    3 Sheets-Sheet 2
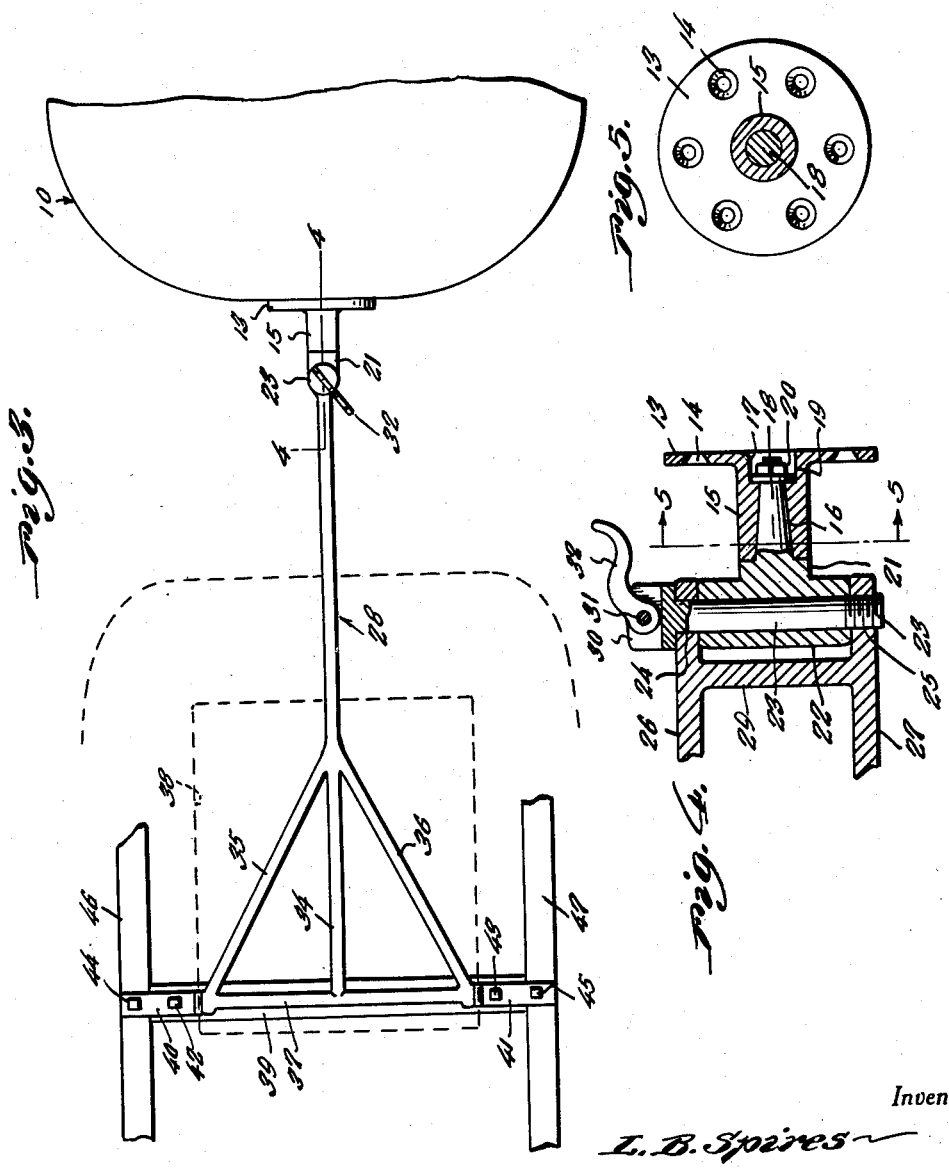

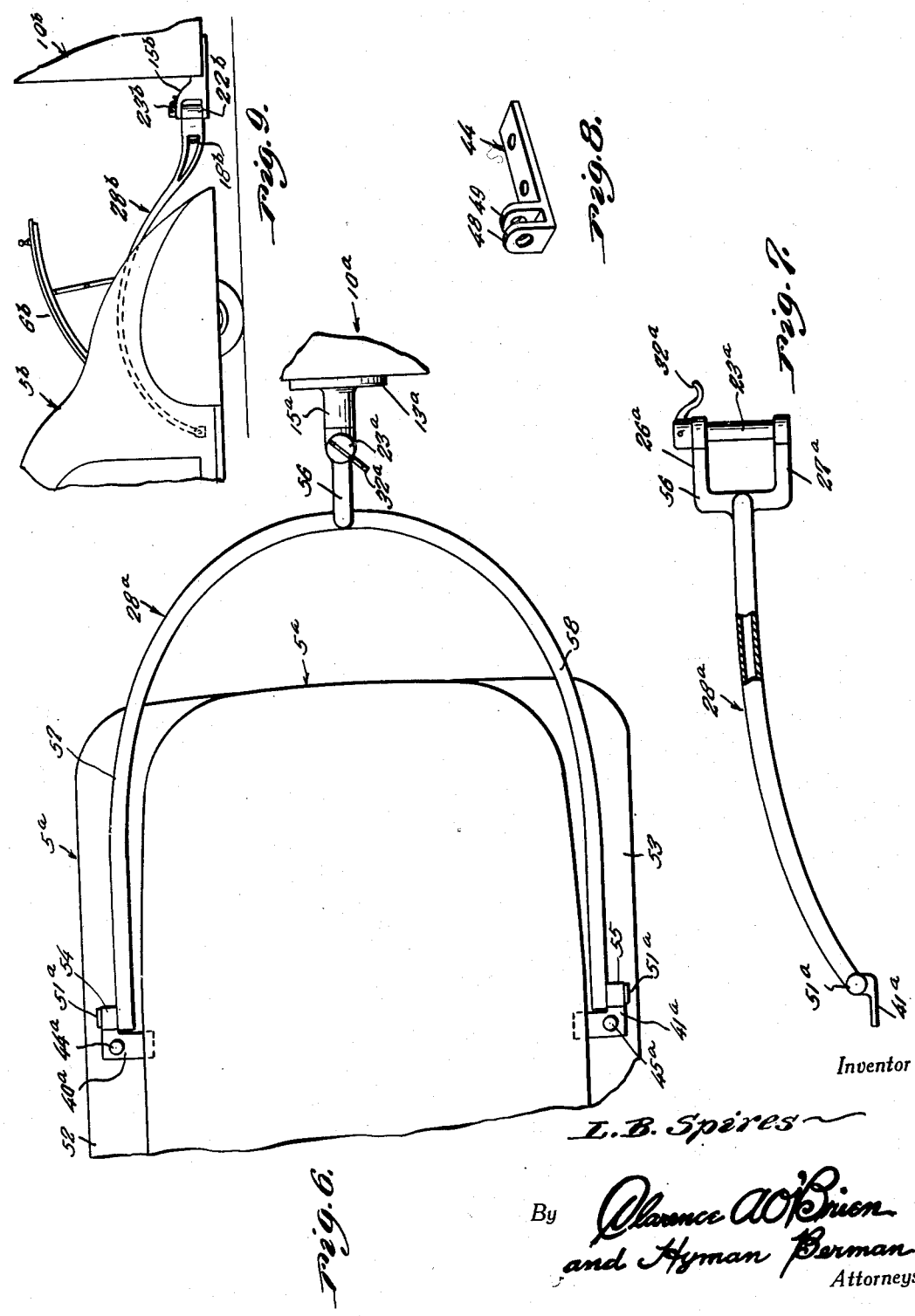

Patented Aug. 20, 1940

2,212,081

UNITED STATES PATENT OFFICE 2,212,081

TRAILER HITCH

Leland B. Spires, Columbus, Ohio

Application January 27, 1939, Serial No. 253,206

1 Claim. (Cl. 280—33.44)

My invention relates generally to trailer hitches for separably connecting a passenger automobile to draw a trailer, and involving arrangements whereby the weight of the trailer is placed forward of the rear axle of the tractor vehicle so as to minimize or eliminate the overburdening of the rear part of the tractor vehicle and the undue ligthening of the front part of the tractor vehicle, which are characteristic of present trailer hitches, and an important object of my invention is to provide hitches of this character which automatically control the course of the trailer, especially in making short turns, so that the trailer wheels will substantially trail the wheels of the passenger automobile, and thereby avoid the fault of running too close to or over curbs, filling station pumps, and the like objects which present obstacles to the operation of trailers having hitches in which no provision is made for this action.

Another important object of my invention is to provide trailer hitches of the character indicated which, although following the same general principle in action, can have different forms and constructions to adapt the same to trailers of different types, and to automobiles having different bodies, and of different makes.

Other important objects and advantages of my invention will be apparent from a reading of the following description taken in connection with the drawings, wherein for purposes of illustration I have shown preferred embodiments of my invention.

In the drawings:

Figure 1 is a general side elevational view showing a coupe type of automobile drawing a trailer of the two wheel type by means of a hitch in accordance with the present invention.

Figure 2 is a plan view showing diagrammatically the manner in which the trailer is caused to follow closely in the path of the automobile in making a sharp turn.

Figure 3 is an enlarged fragmentary top plan view showing the embodiment of the invention illustrated in Figure 1.

Figure 4 is an enlarged longitudinal vertical sectional view taken through Figure 3 approximately on the line 4—4.

Figure 5 is a transverse vertical sectional view taken through Figure 4 approximately on the line 5—5 and looking toward the right in the direction of the arrows.

Figure 6 is an enlarged top plan view similar to Figure 3 but showing another embodiment of the invention.

Figure 7 is a sectional side elevational view of a portion of Figure 6.

Figure 8 is a perspective view of one of the brackets.

Figure 9 is a fragmentary side elevational view similar to Figure 1 but showing the second described embodiment in operation.

Referring in detail to the drawings, and first to Figures 1 through 5, the numeral 5 generally designates a coupe type of passenger automobile having the movable rear deck 6 over the body floor 7 which overlies the rear axle 8 having the wheels 9, and the numeral 10 generally designates a two wheel type of trailer having the ground engaging wheels 12 aligned on the axis designated 11 in Figure 2. Mounted to the front end of the trailer 10 at a suitable elevation is a substantially circular disk 13 which has bolt or screw holes 14 distributed circumferentially therearound to receive screws or bolts which attach the same to the designated part of the body of the trailer. On the disk 13 is formed a generally cylindrical part 15 which has a tapered bore 16 which leads to an enlarged bore portion 17. Turning in the bore 16 is tapered spindle 18 which extends into the enlargement 17 where is located a washer 19 against which bears the nut 20 which is threaded on the end of the spindle so as to bring the bearing shoulder 21 against the adjacent end of the part 15.

The shoulder 21 and the spindle 18 are formed as a part of the vertically elongated journal 22 in which turns the coupling bolt 23 which when in place traverses upper and lower openings 24 and 25 in the upper and lower members 26 and 27 of the draft arm 28. A connecting and reinforcing member 29 is disposed between the elements 26 and 27 adjacent the bolt 23. The upper end or head of the bolt is bifurcated as indicated by the numeral 30 and across the bifurcation extends a pivot pin 31 on which is mounted a laterally extensible handle 32 which facilitates threading the lower end 23 of the said bolt into the threaded opening 25 to secure the connection of the coupling pin.

The draft member 28 or drawbar is of a bowed shape so that the forward end portion is downwardly curved to terminate at the level of the floor 7 of the automobile 5 as shown in Figure 1 of the drawings. While it is not absolutely necessary that the drawbar be formed with the upper and lower members 26 and 27, such structure makes for a sufficiently rigid and strong arrangement without excess weight.

The forward or lower portion of the drawbar is in the triangular form shown in Figure 3 involving the single altitude member 34 which is adjacent to the hypotenuse members 35 and 36. A single base member 37 to which the other members are attached or connected is of a width to pass into the well 38 or trunk space, as the case may be, at the rear of the passenger automobile. On the floor 7 of the automobile preferably, as a point sufficiently forward of the axle 8 to approximate an equal distribution of the weight of the trailer between the front and rear axles of the automobile, there is secured a transverse base plate 39 on which are mounted respective pivot brackets 40 and 41 by fastening means 42 and 43 the same brackets preferably being also fastened as indicated by the respective numerals 44 and 45 to longitudinal side members 46 and 47 of the automobile 5. The form of these brackets is shown in Figure 8 of the drawings and possesses a pair of ears 48 and 49 between which depending ears 50 on the opposite ends of the base member 37 are disposed, with appropriate pivot members 51 passing therethrough to make the pivotal connection permitting the automobile and the trailer to ride at different elevations and different angulations with respect to the horizontal while under way, the spindle 18 affording freedom of the automobile and the trailer to proceed at different lateral angulations.

Referring now to Figures 6, 7, 9, the numeral 5a generally designates a type of passenger automobile which is devoid of a rear deck or a rear trunk opening, but is at the same time provided with lateral supporting elements 52, 53, attached to structurally substantial elements of the car, such as running boards or other structural members to which the brackets 40a and 41a, corresponding to the brackets 40 and 41 of the first described embodiment may be mounted by attaching means respectively designated 44a and 45a. These brackets are substantially similar to those already described and involve a rearwardly placed journal 54 and 55 receiving a pivot member 51a projecting laterally outwardly from the terminals of a U-shaped draft element 28a from the middle of the bight portion of which rearwardly extends a U-shaped element 56 which is composed of the upper and lower parts 26a and 27a, related in function to the upper and lower parts 26 and 27 of the first described embodiment and carrying the coupling bolt 23a structurally similar to the bolt 23 and its appurtenances including the turning handle 32a. In this embodiment the arms 57 and 58 of the U-shaped draft element are comparatively flatly curved as indicated in Figure 7 to clear adjacent parts of the car and may be of tubular material since the formation essentially lends sufficient rigidity with this type of construction. The bolt 23a is adapted to be engaged with the element 22 of the disk supported body 15 as shown in Figure 4 of the drawings to connect the trailer with the automobile 5a.

Referring now to Figure 9 of the drawings wherein a still further form of the invention is shown, this involves a draft element 28b which is arcuate in form, and a U-shaped trailer connection 15b on the bottom of the front of the trailer 10b through which the attaching coupling bolt 23b is passed, the vertical journal 22b of this arrangement being a part of the rear end of the draft element, together with a horizontal spindle 18b similar to the arrangement shown in Figure 4 of the drawings, this whole arrangement being better adapted to certain types of trailers than the foregoing two embodiments.

Referring now to Figure 2 of the drawings wherein the rear axle 8 of the passenger automobile 5 is shown together with its wheels 9, the draft element 28 is shown as working from the point A forward of the axle 8 corresponding to the point of attachment of the draft element to the floor of the automobile, the draft element 28 terminating at a vertical axis corresponding to the bolt 23, and the line B representing the longitudinal axis of the trailer 10 with its rear axle 11 and its ground engaging wheels 12. The dotted lines show how in the execution of a right turn by the automobile the axis of the coupling bolt 23 is shifted laterally in a direction opposite to the direction of turn, so that the front of the trailer 10 is deflected sufficiently in the proper direction so that the trailers will follow more nearly in the tracks of the automobile 5 and thereby running over curbs or into filling station pumps, when the automobile is driven in a turn, thereby eliminating the necessity for the driver of the automobile to make calculations for the safe turning of the trailer, beyond those usually regarded by the driver of an automobile in making a turn.

Although I have shown and described herein preferred embodiments of my invention, it is to be definitely understood that I do not desire to limit the application of the invention thereto, and any change or changes may be made in the structure and arrangement of the parts, within the spirit of the invention and the scope of the subjoined claim.

Having described the invention, what is claimed as new is:

A draw bar for connecting one vehicle to another comprising a bar member longitudinally diverging at one end into upper and lower spaced parts, the terminal portions of said upper and lower parts having perforations therein for receiving a coupling element of one of the vehicles, a vertically arranged connecting piece connecting the upper part to the lower part adjacent said perforated terminal portions, the remaining portion of the bar member being of forked construction and including laterally diverging outer prongs and a straight central prong, all of said prongs being in substantially the same horizontal plane, a bar horizontally arranged and connecting the outer ends of the prongs together and having pintles at its ends for pivotally engaging parts of a second vehicle.

LELAND B. SPIRES.